(12) United States Patent
Narayanan et al.

(10) Patent No.: US 7,702,816 B2
(45) Date of Patent: Apr. 20, 2010

(54) FACILITATING APPLICATION SYNCHRONIZATION WITH A RESERVATION PROTOCOL AT A SENDER WITHOUT APPLICATION RECEIVER PARTICIPATION

(75) Inventors: Ashok Narayanan, Lexington, MA (US); Anca Zamfir, Kanata (CA); Francois LeFaucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/395,592

(22) Filed: Mar. 31, 2006

(65) Prior Publication Data

US 2007/0230358 A1    Oct. 4, 2007

(51) Int. Cl.
G06F 15/16    (2006.01)
(52) U.S. Cl. .................. 709/248; 709/227; 709/245
(58) Field of Classification Search ......... 709/227–237, 709/238–245, 248, 217–219
See application file for complete search history.

(56) References Cited

U.S. PATENT DOCUMENTS

| | | |
|---|---|---|
| 6,493,317 B1 | 12/2002 | Ma |
| 6,628,610 B1 | 9/2003 | Waclawsky et al. |
| 6,721,272 B1 | 4/2004 | Parnafes et al. |
| 6,876,668 B1 | 4/2005 | Chawla et al. |
| 6,909,724 B1 | 6/2005 | Albert et al. |
| 6,931,028 B1 | 8/2005 | Hock |
| 6,973,035 B2 * | 12/2005 | Seddigh et al. ............. 370/235 |
| 2002/0114272 A1 | 8/2002 | Stewart |
| 2003/0233595 A1 | 12/2003 | Charney et al. |
| 2004/0034871 A1 | 2/2004 | Lu et al. |
| 2004/0052207 A1 | 3/2004 | Charney et al. |
| 2004/0090913 A1 | 5/2004 | Scudder et al. |
| 2005/0188065 A1 | 8/2005 | O'Rourke et al. |
| 2005/0281192 A1 | 12/2005 | Nadeau et al. |
| 2006/0039391 A1 | 2/2006 | Vasseur et al. |

(Continued)

OTHER PUBLICATIONS

Network Working Group, Request for Comments: 3473, Generalized Multi-Protocol Label Switching (GMPLS) Signaling Resource ReserVation Protocol-Traffic Engineering (RSVP-TE) Extensions, L. Berger, Jan. 2003.*

(Continued)

*Primary Examiner*—Yasin M Barqadle
(74) *Attorney, Agent, or Firm*—Cesari and McKenna, LLP

(57) ABSTRACT

A technique that facilitates application synchronization with a reservation protocol at a sender without application receiver participation in a computer network. According to the novel technique, the sender sends a path request message to a reservation receiver and may include a request for fast path failure notification to be returned to the sender. The reservation receiver (e.g., a reservation receiver proxy upstream from the application receiver) receives the path request, and in response, returns a reservation request message to the sender, including a request for fast reservation failure notification also to be sent to the sender (e.g., in response to detecting the fast path failure notification request, local policy/configuration, etc.). In the event that an intermediate node between the sender and reservation receiver detects an error during the path request or reservation request, the intermediate node sends corresponding fast failure notification to the sender. The sender may then synchronize, e.g., an application with the reservation protocol, based on receipt of a fast failure notification or a successful reservation request message.

25 Claims, 9 Drawing Sheets

U.S. PATENT DOCUMENTS

2006/0268682 A1* 11/2006 Vasseur ................. 370/216

OTHER PUBLICATIONS

Braden, R. et al., RFC 2205, entitled Resource ReSerVation Protocol (RSVP)—Version 1 Functional Specification, Sep. 1997, pp. 1-1056.
Camarillo, G. et al., RFC 3312, entitled Integration of Resource Management and Session Initiation Protocol (SIP), Oct. 2002, pp. 1-29.
Camarillo, G. et al., RFC 4032, entitled Update to the Session Initiation Protocol (SIP) Preconditions Framework, Mar. 2005, pp. 1-10.
Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.
Perlman, Radia, Interconnections Second Edition: Bridges, Routers, Switches, and Internetworking Protocols, Section 1, pp. 1-7, Addison Wesley longman, Inc. 1999.
PCT Notification of Transmittal of the International Search Report and the Written Opinion of the International Searching Authority, or the Declaration, International Application No. PCT/US07/65446; International Filing Date: Mar. 29, 2007, Date of Mailing Jul. 7, 2008, 10 pages.

* cited by examiner

FACILITATING APPLICATION SYNCHRONIZATION WITH A RESERVATION PROTOCOL AT A SENDER WITHOUT APPLICATION RECEIVER PARTICIPATION

BACKGROUND OF THE INVENTION

1. Field of the Invention

The present invention relates to computer networks and more particularly to facilitating application synchronization with a reservation protocol at a sender without application receiver participation in a computer network.

2. Background Information

A computer network is a geographically distributed collection of interconnected subnetworks for transporting data between network nodes, such as computers. A local area network (LAN) is an example of such a subnetwork. The network's topology is defined by an arrangement of client nodes that communicate with one another, typically through one or more intermediate network nodes, such as routers or switches. As used herein, a client node is a network node that is configured to originate or terminate communications over the network. In contrast, an intermediate network node is a node that facilitates routing data between client nodes. Communications between network nodes are typically effected by exchanging discrete packets of data according to predefined protocols. In this context, a protocol consists of a set of rules defining how the nodes interact with each other.

The data packets transferred among the network nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate nodes to route the packet efficiently through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

In operation, a client node may send a data packet to a network interface of an intermediate network node. Thereafter, the intermediate network node receives the packet and forwards the packet to its next destination. For example, the intermediate network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

Data packets are used to transport many forms of information, including voice and video information, over networks and subnetworks. For instance, voice information may be transmitted in accordance with the Voice over Internet Protocol (VoIP). VoIP refers to a group of technologies used to transmit voice information over data networks from a source node to a destination node. The source and destination nodes employ voice agents that convert voice information from its traditional telephony form to a form that is suitable for packet transmission. In other words, the source node's voice agent encodes, compresses, and encapsulates the voice information into a plurality of data packets, and the destination node's voice agent performs complementary functions to de-encapsulate, uncompress, and decode the VoIP packets. Examples of voice agents include IP telephones, VoIP gateways, certain private branch exchanges (PBXs), personal computers (PCs) running communication applications, network devices providing voice gateway services, etc. Also, video information may be transmitted in accordance with Video on Demand (VoD) standards known to those skilled in the art in a similar manner. For instance, a VoD content server may supply video data streams to one or more "set-top-boxes" of users. Notably, the use of VoIP and VoD are examples of applications (e.g., at an application levels) that a node within the network may operate. Those skilled in the art will understand that other applications may also be operated at network nodes.

A source node (sender) may be configured to transfer a unidirectional stream of data packets, or a "data flow," to a destination node (receiver) in a data network. The data flow may comprise, for example, data or voice/video information. The data flow is unidirectional in that data travels one-way from the sender to the receiver. The logical procession of intermediate network nodes that transmit and receive data packets from the sender to the receiver defines the data flow's data path. A first node that is nearer the receiver in the data flow's data path than a second node in the flow is said to be "downstream" from the second node. Likewise, a first node that is nearer the sender in the data flow's path than a second node in the flow is said to be "upstream" from the second node.

Some data flows are associated with a certain level of quality of service (QoS). For example, a data flow's QoS may specify minimum end-to-end latency or bandwidth requirements needed to support the flow. The Resource ReSerVation Protocol (RSVP) is a network-control protocol that enables source and destination nodes to "reserve" the necessary resources to establish the data flow in accordance with the flow's required QoS. RSVP works in conjunction with routing protocols to, e.g., reserve resources along a data flow between the source and destination nodes to establish a level of QoS required by the data flow. RSVP is defined in R. Braden, et al., *Resource ReSerVation Protocol (RSVP)*, Request For Comments (RFC) 2205, which is hereby incorporated by reference as though fully set forth herein.

In a typical arrangement, the sender sends an RSVP Path message identifying itself and indicating the bandwidth needed by the data flow. The Path message proceeds to the receiver following the flow's data path and each intermediate network node may update an optional "Adspec" object of the Path message. The Adspec object contains, inter alia, information about the properties of the data flow, such as available services, delay, and bandwidth estimates. Adspec objects may be generated by senders or by intermediate nodes, and are modified as they travel from one node to another. An Adspec object advertises the possible service parameters composed of the properties of all previous-hop nodes upstream. Namely, the arriving Adspec object is combined with the node's own parameters and service conditions, and then forwarded to the next node. A receiver can use the Adspec information to predict the end-to-end QoS, to choose the most appropriate service and to scale its QoS request according to the current possibilities of the network.

The receiver receives the Path message and may take into account contents of the optional Adspec object in the Path message to determine the specifics of the reservation requests it will generate for the flow. The receiver generates a "request for resources" in the form of an RSVP reservation request (Resv message) which travels hop-by-hop back to the sender.

Within the Resv message is a "FlowSpec" object, which contains, inter alia, an indication of a peak expected traffic (e.g., bandwidth) from the sender (Tspec), and the requested traffic value to be reserved (Rspec). At each hop, the corresponding intermediate network node sets aside ("assigns") sufficient resources to provide the requested bandwidth for the desired data flow. These assigned resources are consequently made available to the data flow so that the data packets of the flow get appropriate QoS treatment (i.e., the data flow is "admitted").

If sufficient resources are not available, an intermediate network node may "reject" the Resv message (i.e., does not continue forwarding it), generate a reserve error (ResvErr) message, and forward the ResvErr message downstream over the flow to the receiver. The receiver eventually receives the ResvErr message and concludes that the reservation has failed. A receiver whose Resv message has been rejected may attempt to acquire less resources by sending another Resv message requesting less bandwidth, or the receiver may re-attempt later to acquire the resources by re-transmitting another Resv message. Senders are unaffected by this process, and they continue to send Path messages to refresh their state. Notably, PathErr and ResvErr messages are typically sent and processed hop-by-hop by the intermediate nodes along the path between the sender and the receiver, as will be understood by those skilled in the art.

RSVP signaling may be used between a sender and a receiver to perform resource reservation for particular applications requiring QoS guarantees (e.g., VoIP, VoD, etc.). In this case, it is essential that the RSVP reservation establishment be tightly synchronized with the application. For example, VoIP calls should not "ring" the called phone (the receiver) until the RSVP reservation is completed in order to avoid "ghost" rings as will be understood by those skilled in the art. Generally, the application synchronization with RSVP reservation incorporates cooperation of the end-points (i.e., sender and receiver) of both the application and the reservation since both end-points are involved in the signaling of the application and the reservation. An example application synchronization is described in detail in RFC 3312, entitled *Integration of Resource Management and Session Initiation Protocol (SIP)*, updated by RFC 4032, entitled *Update to the Session Initiation Protocol (SIP)*, Preconditions Framework, both of which are hereby incorporated by reference as though fully set forth herein.

In a typical example of application synchronization, e.g., VoIP, a sender may wish to initiate an application session (e.g., call) to a receiver, for which resources need to be reserved to ensure QoS to the session. Accordingly, the sender requests the session is by sending an "offer" to the receiver, and including within the offer an indication that resources ought to be reserved before the session establishment can be completed (i.e. resource reservation is a "precondition"). The receiver may then respond to the offer and provide information details about the session but may put the session establishment on hold until resource reservation is completed. The sender may then trigger reservation establishment (e.g. by sending an RSVP Path message). The receiver may answer the resource reservation request (e.g. by sending an RSVP Resv message). Once the sender receives the answer indicating that the requested resources have been reserved, the sender acknowledges the preconditions to the receiver at the application level signaling. The receiver may then resume establishment of the application session (e.g., and acknowledge the establishment to the sender so that it may also establish the session). In this manner, the application and resource reservation have been successfully synchronized (i.e., the application session has not been established—and for example, the remote phone has not rung—without acknowledging first that the requested resources have been reserved).

In some network environments, however, the receiver is not configured for resource reservation (e.g., RSVP) or is not capable of participating in resource reservation. In many of these situations, a reservation receiver proxy may be located upstream from the receiver (an "application receiver"). Here, the reservation receiver proxy (a "reservation receiver") performs the resource reservation signaling on behalf of the application receiver. As such, the application receiver is not involved with the resource reservation. Because of this, the application receiver may not participate in the synchronization between the resource reservation and the application establishment. Also, as the reservation receiver is not an endpoint for the application, it too may not participate in the synchronization between the resource reservation and the application establishment. In particular, a reservation receiver proxy may be unaware of application level signaling, and thus may be unable to effectively communicate synchronizing messages with the sender. For instance, any admission rejection or errors resulting from the reservation of resources are generally sent to the reservation receiver. According to reservation protocols (e.g., RSVP), the sender may not be notified of this failure. Conventionally, the application receiver would notify the sender of the failure, but as mentioned above, the reservation receiver and application receiver are separate nodes, so this may not be the case (e.g., or possible). It would be beneficial, then, for the sender to synchronize the application with the reservation protocol by itself.

An example of a reservation receiver proxy may be illustrated with reference to VoD applications. VoD content providers may wish to prevent the distribution of VoD content to set-top-boxes ("application receivers") unless the appropriate resources are reserved (e.g., for admission control), as will be understood by those skilled in the art. Many set-top-boxes, however, may not be configured for resource reservation (e.g., RSVP), and it may be difficult to otherwise "upgrade" the configuration of the boxes. A reservation receiver proxy may be placed upstream from the set-top-boxes to handle the resource reservation, but, as mentioned above, there are problems associated with application synchronization with a reservation receiver proxy.

Various solutions have been proposed for application synchronization at a sender without participation from the application receiver. One such solution consists of the sender attempting to "guess" the status of the reservation. For instance, where a resource reservation request (e.g., Path message) has been sent by the sender, if the sender has not received a response (e.g., Resv message) within a configurable length of time, the sender may assume that the reservation has failed. While this solution allows for application synchronization, it may be slow (i.e., based on the configured length of time sufficient to declare a failed reservation), and may not account for failures after an initial reservation establishment (e.g., an established reservation may be rejected later in response to network element failures), as will be understood by those skilled in the art.

Another proposed solution is to have the reservation receiver proxy generate a "fake" path request error message (e.g., PathErr) to send to the sender in response to receiving a reservation request error message (e.g., ResvErr). In this manner, the "fake" path request error message ("fake" because it is not conventional for a reservation receiver to send path request error messages to the sender in response to reservation failures) may inform the sender of the reservation failure. This approach also suffers from various limitations, including, e.g., a slow response time. For instance, when an intermediate network node between the reservation receiver and sender detects a reservation error, the reservation error message is sent and processed hop-by-hop downstream to the reservation receiver. The reservation receiver may then generate the "fake" path request error message, which is then sent and processed hop-by-hop upstream to the sender. This hop-by-hop processing may be time-consuming, and the solution, therefore, is suboptimally responsive. Also, this solution may be poorly scalable, since where a large network failure occurs, the reservation receiver proxy may be inundated with hundreds or thousands of error messages, resulting in a processing surge and additional delay.

Because tight application synchronization to a reservation protocol is essential (e.g., to interrupt corresponding data flows, etc.), as will be understood by those skilled in the art, minimizing the delays associated with informing the sender of a reservation failure is critical. One such way to minimize the delay with regard to error notifications is the use of a fast failure notification, or a "Notify" feature, as described in RFC 3473, entitled, *Generalized Multi-Protocol Label Switching (GMPLS) Signaling Resource ReSerVation Protocol-Traffic Engineering (RSVP-TE) Extensions*, dated January 2003, which is hereby incorporated by reference in its entirety. In particular, a request (e.g., a Notify request) may be included within the path request or reservation request messages requesting that the intermediate node detecting an error send a fast failure notification along with the conventional error messages (e.g., PathErr and ResvErr, respectively). For example, the reservation receiver may request that a fast reservation failure notification (e.g., for a ResvErr) may be generated and sent to the reservation receiver in response to reservation request errors (i.e., without processing by other intermediate nodes). Also, the sender may request that a fast path failure notification (e.g., for a PathErr) be generated and sent to the sender in response to path request errors.

While the fast failure notification may accelerate the notification of reservation failures to the reservation receiver (e.g., a reservation receiver proxy), the reservation failure notifications are still addressed to, and processed by, the reservation receiver, so it does not help in providing failure notification to the sender. There remains a need, therefore, for a technique that tightly and efficiently synchronizes an application to a reservation protocol at a sender. In particular, a need remains for synchronization where the application level signaling and reservation level signaling terminate at different end-points (i.e., at an application receiver and a reservation receiver), e.g., without application receiver participation.

SUMMARY OF THE INVENTION

The present invention is directed to a technique for facilitating application synchronization with a reservation protocol at a sender without application receiver participation in a computer network. According to the novel technique, the sender sends a path request message (e.g., using Resource ReSerVation Protocol, RSVP messages) to a reservation receiver and may include a request for fast path failure notification to be returned to the sender. The reservation receiver (e.g., a reservation receiver proxy upstream from the application receiver) receives the path request, and in response, returns a reservation request message to the sender, including a request for fast reservation failure notification also to be sent to the sender (e.g., in response to detecting the fast path failure notification request, local policy/configuration, etc.). In the event that an intermediate node between the sender and reservation receiver detects an error during the path request or reservation request, the intermediate node sends corresponding fast failure notification to the sender. The sender may then synchronize, e.g., an application with the reservation protocol, based on receipt of a fast failure notification or a successful reservation request message.

Advantageously, the novel technique facilitates application synchronization with a reservation protocol at a sender without application receiver participation in a computer network. By directing fast reservation failure notification to the sender instead of the reservation receiver, the novel technique allows the sender to synchronize the application with the reservation protocol by itself. In particular, application synchronization may be possible at the sender where the application receiver/end-point is different from the reservation receiver/end-point, e.g., such as where a reservation receiver proxy is used. Also, processing of the failure notifications by intermediate nodes may be reduced, e.g., due to the fewer number of nodes having to forward the failure notifications to reach the sender. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

Figure 1:
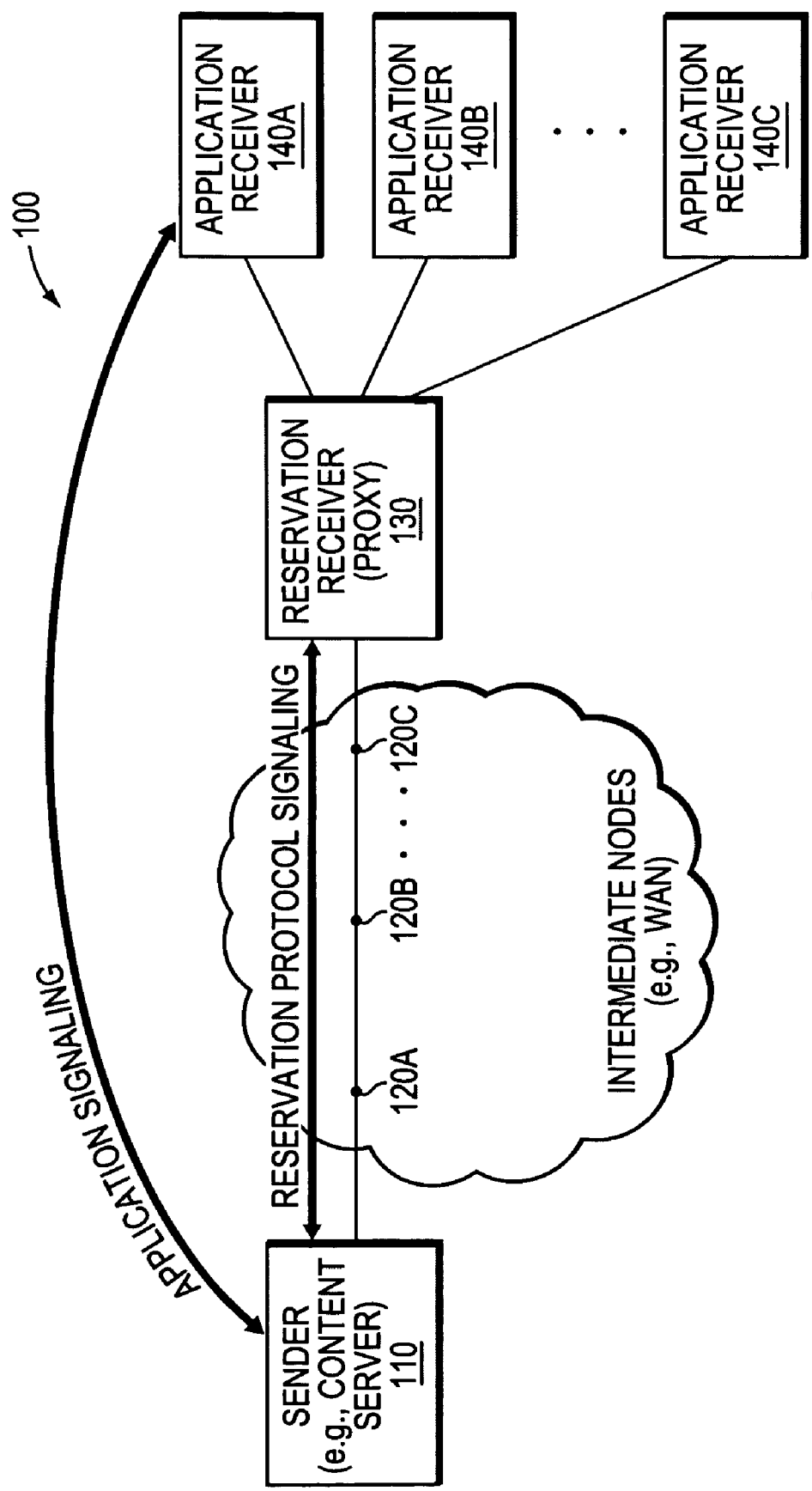
FIG. 1 is a schematic block diagram of an exemplary computer network that may be advantageously used with the present invention.

FIG. 1 is a schematic block diagram of an exemplary computer network 100 that may be advantageously used with the present invention. The network 100 comprises a plurality of interconnected network nodes, such as a sender node 110 (e.g., a content server), a reservation receiver node 130 (e.g., a proxy) and one or more application receiver nodes 140A-C. Illustratively, the sender 110 and reservation receiver 130 may be interconnected by one or more intermediate nodes 120A-C, such as, e.g., over wide area network (WAN) links (or local area network, "LAN" links, point-to-point links, wireless LANs, etc.), to form the network 100. Those skilled in the art will understand that any number of nodes, links, etc., may be used in the computer network 100 and connected in a variety of ways, and that the view shown herein is for simplicity.

Figure 2:
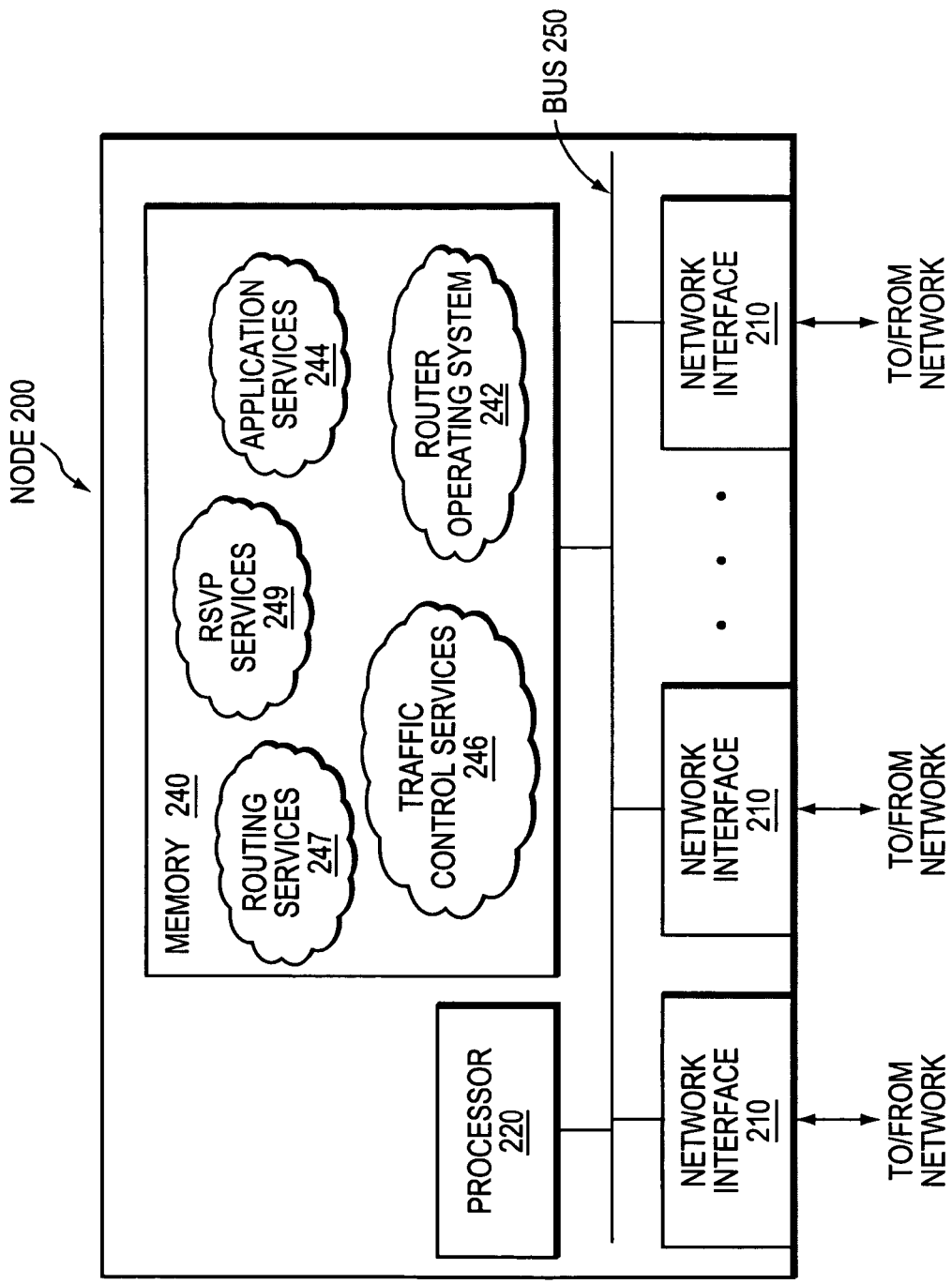
FIG. 2 is a schematic block diagram of an exemplary node that may be advantageously used with the present invention.

FIG. 2 is a schematic block diagram of an exemplary node 200, which is illustratively a router that may be advantageously used with the present invention as an end-point (e.g., sender and/or receiver nodes) or an intermediate node. The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, RSVP, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise application services 244, is traffic control services 246, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), IP, BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

Application services 244 contain computer executable instructions executed by processor 220 to perform functions provided by one or more applications, such as, e.g., Voice over IP (VoIP), Video on Demand (VoD), etc., as will be understood by those skilled in the art. Notably, these functions may be configured to cooperate with reservation protocol services, such as RSVP services 249, such as in accordance with the present invention described herein.

RSVP services 249 contain computer executable instructions for implementing RSVP and processing RSVP messages in accordance with the present invention. RSVP is described in Request for Comments (RFC) 2205, entitled *Resource ReSerVation Protocol (RSVP)*, and RFC 3473, entitled, *Generalized Multi-Protocol Label Switching (GMPLS) Signaling Resource ReSerVation Protocol-Traffic Engineering (RSVP-TE) Extensions*, both as incorporated above.

In accordance with RSVP, to establish a data flow between end nodes such as a sender 110 and a reservation receiver 130, the sender may send an RSVP path (Path) message downstream to the receiver along the flow's data path (e.g., a unicast route) to identify the sender and indicate (e.g., bandwidth needed to accommodate the data flow, along with other attributes of the data flow. The Path message may contain various information about the data flow including, e.g., traffic characteristics of the data flow.

Figure 3:
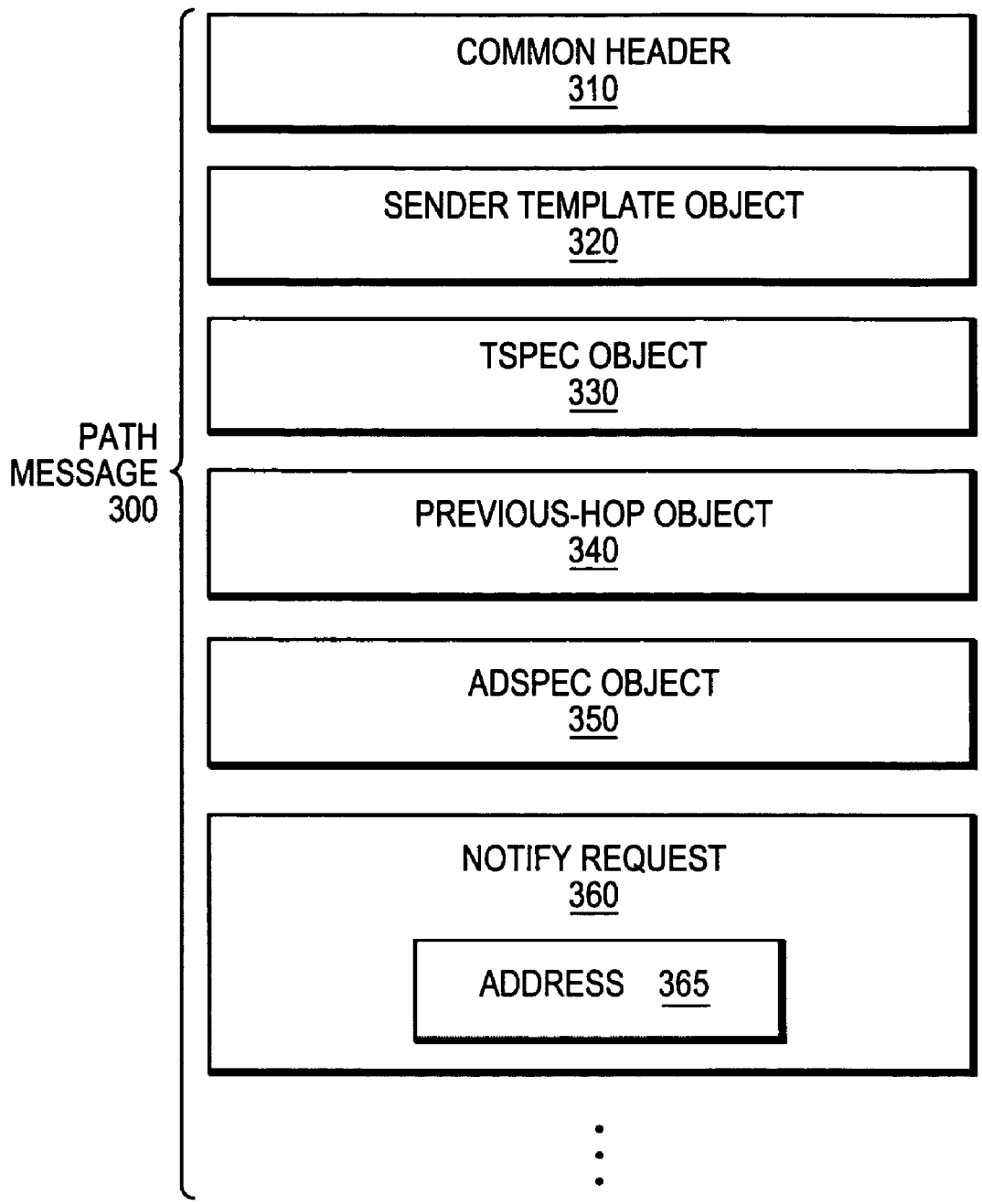
FIG. 3 is a schematic block diagram of portions of a path request message that may be advantageously used with the present invention.

FIG. 3 is a schematic block diagram of portions of a path request (e.g., RSVP Path) message 300 that may be advantageously used with the present invention. Path message 300 contains, inter alia, a common header 310, a sender template object 320, a traffic specification (Tspec) object 330, a previous-hop object 340, and an advertised flow specification (Adspec) object 350. The sender template object 320 holds information about the sender, such as an address and port associated with the sender, while Tspec object 330 holds information that, e.g., defines various traffic characteristics of a data flow between the sender and a receiver. Previous-hop object 340 holds information relating to a previous hop (node) in the flow between the sender and receiver. The Adspec object 350 contains, inter alia, information about the properties of the data flow, such as available services, delay, and bandwidth estimates. Adspec objects may be generated by senders or by intermediate nodes, and are modified as they travel from one node to another, advertising the possible service parameters composed of the properties of all previous-hop nodes upstream.

In accordance with RFC 3473 incorporated above, a Notify Request object 360 may also be included within the Path message 300. The Notify Request object 360 may be used by the sender to request that fast failure notification be sent to the sender, such as by including the sender's address in address field 365, in the event of a path state failure at an intermediate node. In this sense, the Notify Request object may be referred to as a "fast failure notification request," accordingly (specifically, a "fast path failure notification request"). Fast failure notification is described in more detail below with reference to Notify Message 600 of FIG. 6.

In accordance with RSVP, a reservation receiver establishes a new reservation for a data flow between the sender and receiver by responding to a sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver.

Figure 4:
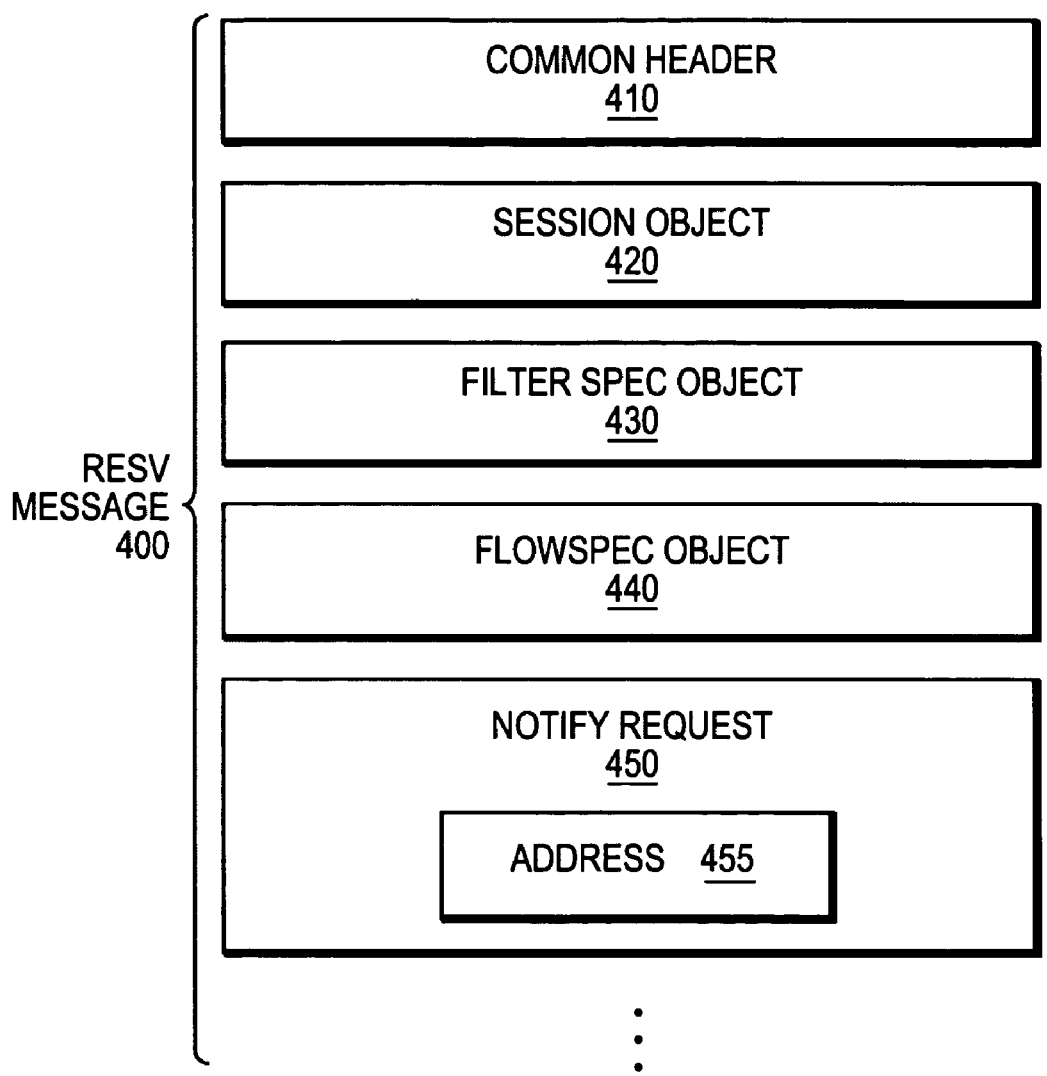
FIG. 4 is a schematic block diagram of portions of a reservation request message that may be advantageously used with the present invention.

FIG. 4 is a schematic block diagram of portions of a reservation request (e.g., RSVP Resv) message 400 that may be advantageously used with the present invention. Resv message 400 contains a common header 410, a session object 420, a filter specification (filter spec) object 430, and a flow specification (flowspec) object 440. The session object 420 may contain address information of the receiver, while the filter spec object 430 may contain address information of the sender. Also, the flowspec object 440 may contain information that defines various traffic characteristics associated with the new reservation. It should be noted that other objects defined by, e.g., the RSVP, may be included in the reservation request message, such as a policy data object, a reservation confirmation object. Also, a Notify Request object 450 may be included within the Resv message 400, similar to the Notify Request object 360 above. Here, however, the Resv message 400 requests fast failure notification of the reservation state (a "fast reservation failure notification"), and the address 455 conventionally contains the address of the reservation receiver sending the request.

Figure 5:
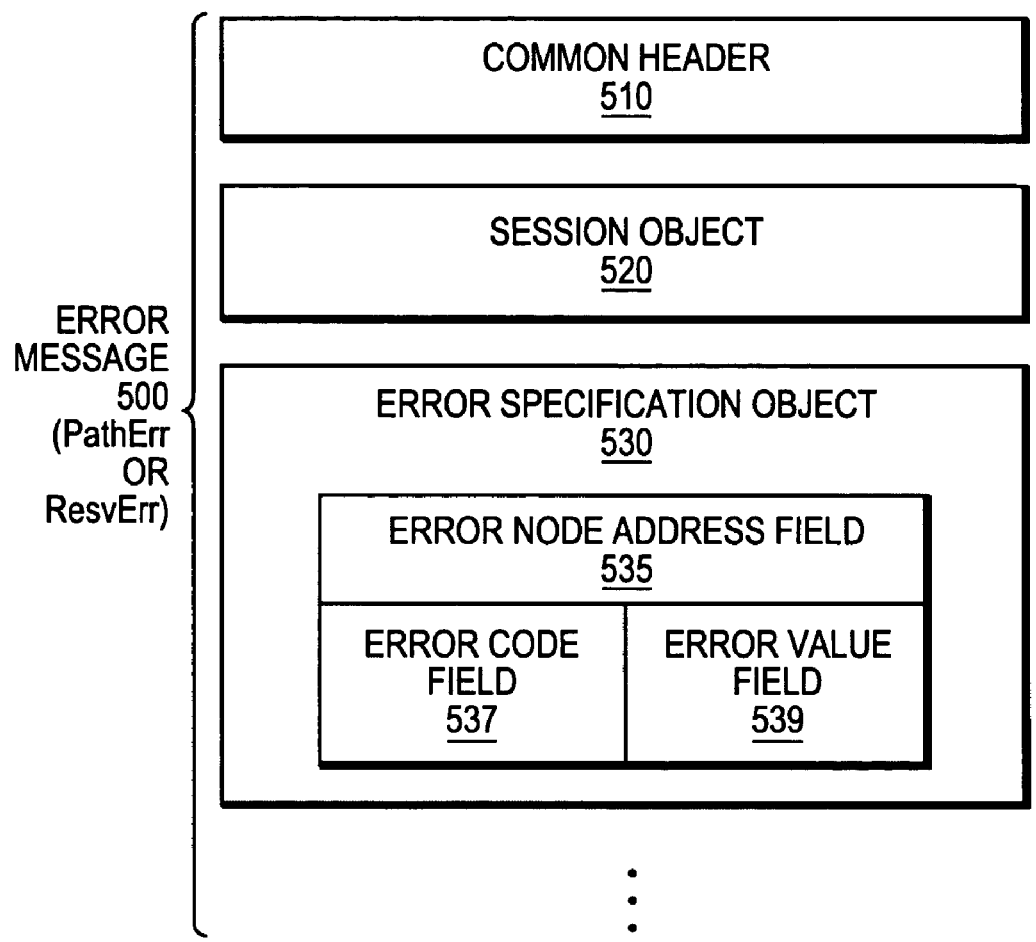
FIG. 5 is a schematic block diagram of an error message that may be advantageously used with the present invention.

If an intermediate node in the flow between the sender and receiver acquires a Path message 300 or Resv message 400 for a new reservation and cannot comply with the request (e.g., reserve sufficient resources for the new reservation, etc.) the intermediate node generates and forwards a path or reservation error (PathErr or ResvErr) message to the receiver, respectively. FIG. 5 is a schematic block diagram of an error message 500 that may be advantageously used with the present invention, e.g., as a PathErr or ResvErr message.

Error message 500 comprises in part a common header 510, a session object 520, and an error specification object 530. The session object 520 identifies, inter alia, the destination address of the message (sender or receiver). The error specification object 530 contains, inter alia, an error node address field 535, an error code field 537, and an error value field 539. The error node address field 535 holds a value that represents an address (e.g., IP address) of a node in the flow that detected the error (e.g., insufficient resources). The error code field 537 holds a value that describes the error and the error value field 539 holds a value that represents additional information about the error.

Figure 6:
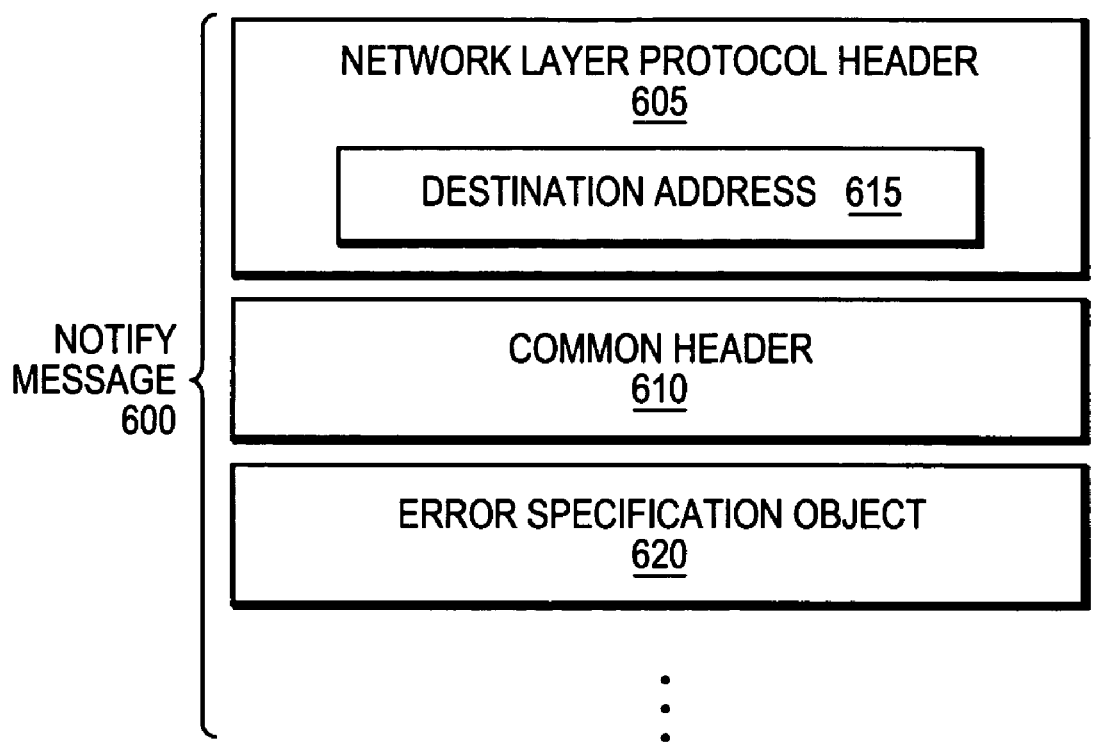
FIG. 6 is a schematic block diagram of a fast failure notification message that may be advantageously used with the present invention.

In addition to the Error messages 500 sent after a failure is detected, and in response to a request for fast failure notification (e.g., Notify Request object 360 or 450 in the Path message 300 or Resv message 400, respectively), the intermediate node also generates and sends a fast failure notification message to the address contained within the respective address fields (365 or 455). The fast failure notification, or Notify message, contains information that indicates to the sender or receiver that a failure has occurred. FIG. 6 is a schematic block diagram of a fast failure notification (Notify) message 600 that may be advantageously used with the present invention.

Notify message 600 comprises a common header 610 and an error specification object 620. It should be noted that other objects and information, such as session lists, message IDs, etc., may be included in the Notify message 600. The error specification object 620 contains information to identify the failure similar to the error specification object 530 of the PathErr or ResvErr messages 500 above in FIG. 5. As mentioned above, using a fast failure notification message 500 avoids per-hop processing of error messages 500 by intermediate nodes, and allows the end-points (e.g., the sender or reservation receiver) to quickly obtain respective failure notification. Notably, the Notify message 600 is sent to the address contained within the destination address field 615 of a network layer protocol (e.g., IP) header 605, which is taken from respective address fields 365 and 455 of the fast failure notification requests. For instance, conventionally, if a sender has requested fast path failure notification be sent to its address (address field 365), the destination address 615 of the Notify message is the address of the sender. Also conventionally, if a reservation receiver has requested fast reservation failure notification be sent to its address (address field 455), the destination address 615 of the Notify message is the address of the reservation receiver. The use of the address fields 365, 455, and 615, in accordance with the present invention, are described in further detail below.

Figure 7:
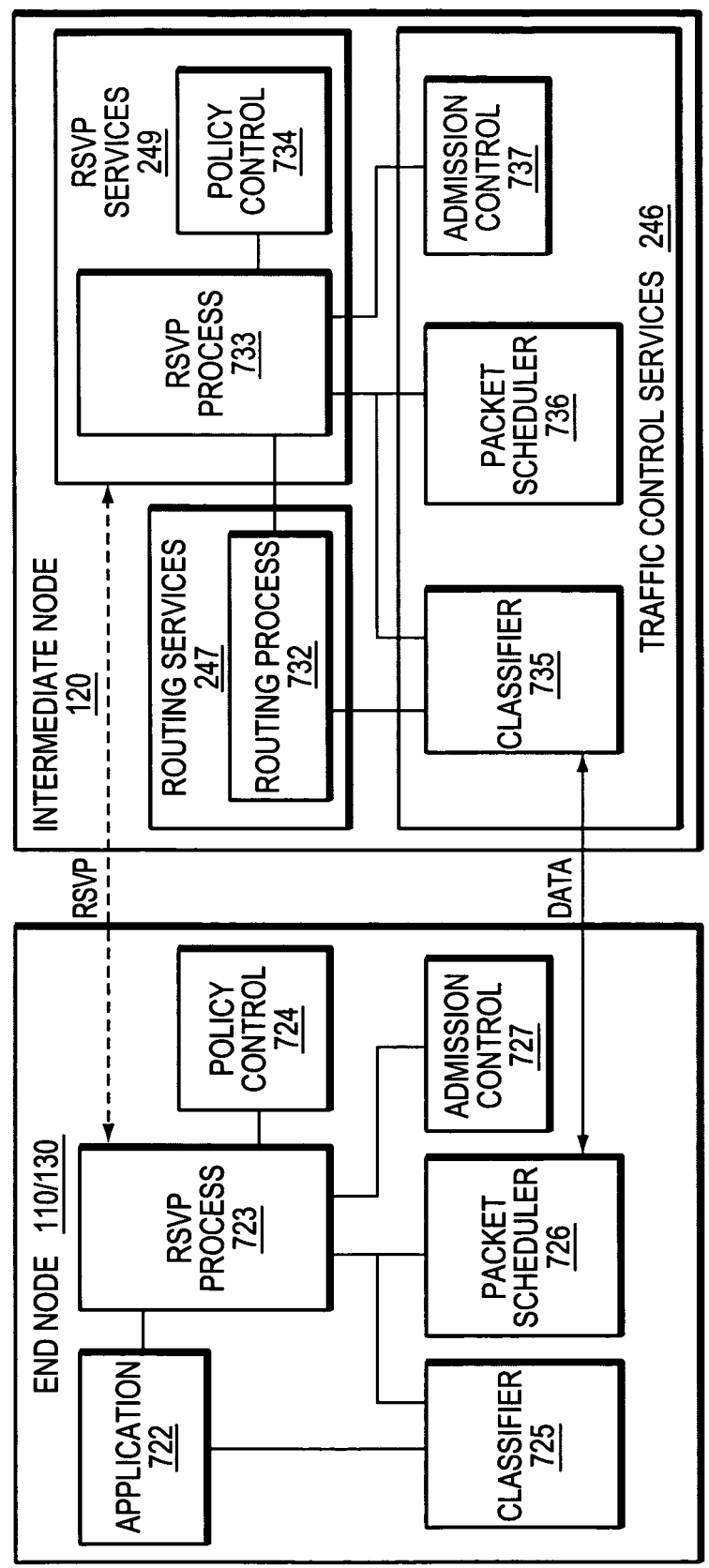
FIG. 7 is a schematic block diagram of various functional blocks associated with the Resource ReSerVation Protocol.

FIG. 7 is a schematic block diagram of various functional blocks involved in processing e.g., RSVP messages, as well as implementing Quality of Service (QoS) for data flows in end nodes (e.g., sender 110 and reservation receiver 130) and intermediate nodes 120. End node 110/130 comprises an application 722 (e.g., application services 244), which interfaces with an RSVP process 723 (e.g., RSVP services 249) and a classifier 725. In addition, end node 110/130 comprises a packet scheduler 726, policy control 724 and admission control 727. The application 722 may issue various QoS requests for data flows associated with the application 722. The RSVP process 723 processes the requests, and generates and issues various RSVP messages (e.g., Path messages, Resv messages) in response to the requests. These messages may be used to communicate at the RSVP level with the RSVP process 733 in the intermediate node 120.

The QoS for a data flow on the end node 110/130 is implemented by functions collectively known as "traffic control" (e.g., traffic control services 246). These functions include the classifier 725, packet scheduler 726, and admission control 727. The classifier 725 determines a QoS class for packets issued by the end node 110/130. The packet scheduler 726 determines when the issued packets are forwarded from the end node 110/130 to the intermediate node 120. The admission control function 727 determines whether the end node contains sufficient resources for allocation to a new reservation associated with a data flow.

Assume node 110/130 is a reservation receiver 130 on a flow between a sender 110 and a receiver 130 and that the application 722 has received a Path message from the sender. Further assume, in response to the Path message, the application 722 establishes a new reservation for a data flow between the sender and receiver by issuing a request that sets out the QoS requirements for the data flow to the RSVP process 723. The RSVP process 723 in conjunction with the policy control 724 and admission control 727 functions determine (check) whether the application has permission to establish the new reservation and, if so, whether sufficient resources exist on end node 110/130 to meet the requirements (QoS) of the new reservation. If both checks succeed, various parameters are set in the packet classifier 725 and packet scheduler 726 to reserve sufficient resources on end node 110/130 to obtain the requested QoS for the new reservation. Further, the RSVP process 723 may generate various RSVP messages (e.g., Resv message) that are forwarded to the sender via intermediate node 120.

The intermediate node 120 likewise contains an RSVP process 733, a policy control function 734, a classifier 735, a packet scheduler 736, and an admission control function 737. In addition, the intermediate node contains a routing process 732, which may be configured to implement various routing protocols, such as OSPF and IS-IS. The RSVP process 733 and policy control function 734 are illustratively contained in the intermediate node's RSVP services 249. The classifier 735, packet scheduler 736, and admission control 737 are illustratively contained in the intermediate node's traffic control services 246.

The RSVP process 733 processes RSVP messages (e.g., Resv messages) acquired by the intermediate node 120. This processing may include passing requests to the policy control function 734 and admission control function 737 to determine (check) whether the nodes (e.g., end node 110/130) issuing the messages have permission to make reservations and determine if sufficient resources are available for the reservations. If both checks succeed, various parameters may be set in the intermediate node's packet classifier 735 and packet scheduler 736 to obtain the requested QoS. Further, the intermediate node 120 may forward the acquired RSVP messages to the next intermediate node in the flow associated with the various reservations. It should be noted that the functional blocks illustrated in FIG. 7 may be implemented in hardware, software, firmware, or some combination thereof.

The present invention is directed to a technique for facilitating application synchronization with a reservation protocol at a sender without application receiver participation in a computer network. According to the novel technique, the sender sends a path request message (e.g., using RSVP messages) to a reservation receiver and may include a request for fast path failure notification to be returned to the sender. The reservation receiver (e.g., a reservation receiver proxy upstream from the application receiver) receives the path request, and in response returns a reservation request message to the sender, including a request for fast reservation failure notification also to be sent to the sender (e.g., in response to detecting the fast path failure notification request, local policy/configuration, etc.). In the event that an intermediate node between the sender and reservation receiver detects an error during the path request or reservation request, the intermediate node sends corresponding fast failure notification to the sender. The sender may then synchronize, e.g., an application with the reservation protocol, based on receipt of a fast failure notification or a successful reservation request message.

In accordance with the present invention, a sender 110, e.g., one that is both a reservation sender/end-point and application sender/end-point, is configured to communicate with one or more application receivers/end-points 140 (i.e., on the application level) and one or more reservation receivers/end-points 130 (i.e., on the reservation level). Illustratively, as shown in FIG. 1, the application and reservation receivers may be embodied as separate nodes. Those skilled in the art, however, will understand that both receivers may be embodied within a single node, and that the present invention may be still be advantageously used accordingly.

The sender 110 and an application receiver 140 may wish to establish an application session, such as, e.g., a VoIP call or VoD session (e.g., where the sender is a VoD content server), as will be understood by those skilled in the art. The sender 110, in response, may generate a path request message (e.g., RSVP Path message 300) in order to establish a data flow (stream) path to the application receiver 140. The path request may indicate various preconditions or constraints, such as a need for bandwidth reservation, etc. Where tight synchronization is required, such as in accordance with the present invention, the sender 110 may be configured to include a request for fast path failure notification (e.g., Notify request 360) to be returned to the sender, e.g., by placing the sender's address (e.g., an IPv4 or IPv6 address) into the address field 365. The path request may then be forwarded hop-by-hop along a path of intermediate nodes 120 toward the application receiver 140. Any detected failures during transmission of the path request message (e.g., a path state error) may be handled in a conventional manner by the intermediate nodes 120. In other words, a path error message (PathErr 500) may be generated and sent hop-by-hop to the sender 110, in addition to a requested fast path failure notification message (Notify message 600) sent directly to the sender. Otherwise, the path message may continue toward the application receiver 140.

In the event there is a reservation receiver proxy 130 prior to the application receiver 140 along the path, such as where the application receiver 140 is not configured for reservation protocol signaling (e.g., RSVP), the proxy intercepts the path request message as the reservation receiver/end-point 130. If there is no proxy, then the application receiver 140 may be the reservation receiver/end-point as well. Accordingly, the sender 110 may or not be aware of the existence of a reservation receiver proxy 130 upstream of the application receiver 140, and may simply attempt to forward reservation protocol signaling messages to the application receiver 140 (i.e., assuming that it is also a reservation receiver 130), as will be understood by those skilled in the art.

In response to the received path request message (Path message 300), the reservation receiver 130 illustratively determines whether a fast path failure notification request (Notify request 360) was included. If not, the reservation receiver continues in a conventional manner, e.g., by returning a reservation request message (Resv message 400) without a fast reservation failure request (Notify request 450) to be sent to the sender. (Those skilled in the art will understand that the reservation receiver may still include a Notify request 450 addressed to itself in the conventional manner.) If a fast path failure notification request is included, however, the reservation receiver 130 generates a reservation request message 400 having a fast reservation failure notification request 450. Alternatively, the reservation receiver 130 may be configured to generate a reservation request message 400 having a fast reservation failure notification request 450 in response to other triggers that will be understood by those skilled in the art (e.g., local policy/configuration to always include the fast reservation failure notification request, path requests 300 with certain priority levels, other objects within a patch request, etc.). The fast path failure notification request is merely one illustrative example of such a trigger, and those skilled in the art will understand that other triggers may be advantageously used in accordance with the present invention.

In the case where the reservation receiver 130 is a proxy to one or more application receivers 140, the reservation receiver may be configured to be aware that it is a proxy. Accordingly, the proxy determines that the ultimate destination (i.e., the application receiver) may not be informed of downstream notification, particularly reservation failure notifications (e.g., fast or conventional), because of the proxy's existence. As such, the proxy may determine that error messages should be sent to the sender to be handled appropriately (i.e., since the proxy may be unable to signal the sender at the application level).

Notably, RFC 3473 (incorporated above describing Notify requests) does not prevent a reservation receiver (e.g., proxy or not) from inserting an address other that its own into address field 455 of the Notify request 450. The present invention, therefore, takes advantage of this feature in a novel way. In particular, the reservation receiver examines the content (i.e., address) of the address field 365 of the received fast path failure notification request 360, and inserts this address into the address field 455 of the fast reservation failure request. Because the sender 110 is configured to insert its address into address field 365, the fast reservation failure request 450 correspondingly includes the address of the sender.

The reservation receiver 130 forwards the reservation request message 400 toward the sender 110 along the path of intermediate nodes 120. Where no reservations errors are detected, the successful reservation request eventually reaches the sender 110, and the application may be successfully synchronized with the application receiver 140 (such as, e.g., through application level signaling, as will be understood by those skilled in the art). In the event, however, that an intermediate node 120 detects a failure (e.g., a reservation state error), the intermediate node handles the failure in a conventional manner. In other words, if there is no request for fast reservation failure notification in the reservation request message 400, the intermediate node 120 returns a reservation error message (ResvErr 500) to the reservation receiver 130. On the other hand, if there is a request for fast failure notification (e.g., notify request object 450), the intermediate node 120 generates and sends a fast reservation failure notification (Notify message 600) to the requested address (e.g., of address field 455). In accordance with the present invention, however, the requested address has been configured as the address of the sender 110, and therefore, the fast reservation failure notification is sent to the sender accordingly.

The present invention avoids error handling and signaling delays associated with the hop-by-hop receiving and processing of conventional reservation error messages (ResvErr messages 500) by intermediate nodes 120 by inserting the error codes into a packet and sending the packet directly to the sender (i.e., a fast reservation failure notification to the sender). The present invention also avoids delays associated with reservation error processing by the reservation receiver 130, thus being advantageously applicable (i.e., faster synchronization response) in both situations where the application and reservation receivers are or are not the same receiver. For instance, rather than send errors to a single application/reservation receiver first, the present invention bypasses any processing by the receiver and sends a fast failure notification directly to the sender 110. Notably, fast failure notifications may be sent in addition to the conventional path or reservation error messages, rather than replacing the conventional error messages. Particularly, intermediate nodes 120 and the reservation receiver 130 may still become aware of the failure through the reservation error messages (ResvErr 500) even though the sender is now receiving the fast failure notification. This is important so that the intermediate nodes 120 and reservation receiver 130 may remove any previously reserved states for the requested data flow path.

By sending the fast reservation failure notification 600 directly to the sender 110, e.g., especially where the reservation receiver 130 is not the application receiver 140, the present invention allows for tight synchronization of the application to the reservation protocol. In particular, the sender 110 is made aware of a reservation failure in a faster, more efficient manner, and may quickly determine that the application was unsuccessful. Notably, because the fast reservation failure notification 600 may contain reservation-type error code messages (e.g., in error specification object 620), the sender 110 may be configured to interpret such error code messages (normally sent to a reservation receiver) accordingly in order to comply with the present invention. Alternatively, the sender 110 may simply be configured to detect the receipt of the fast reservation failure notification 600 without interpreting the error code messages 620, and determine that an unsuccessful application synchronization has resulted.

Figure 8:
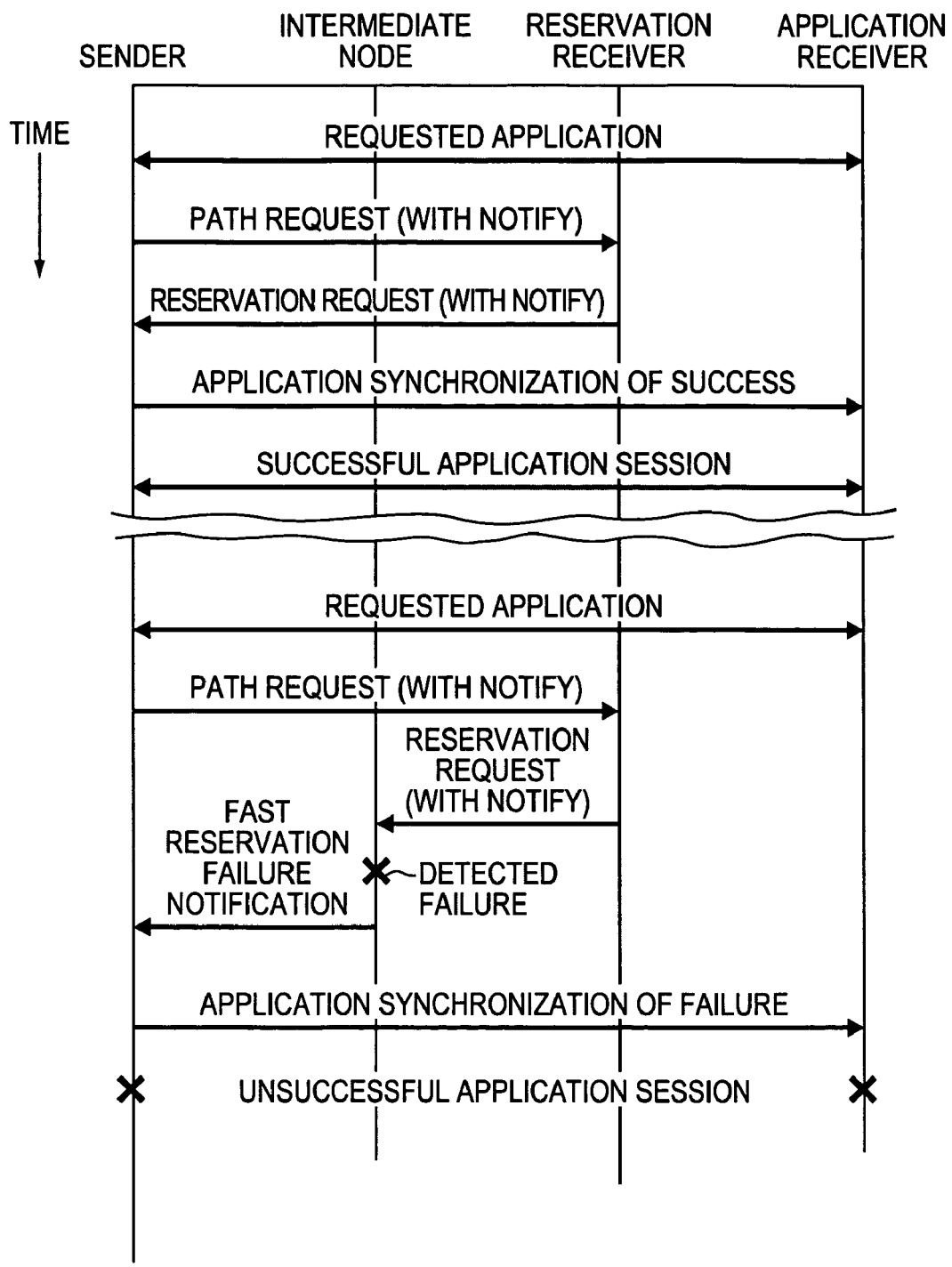
FIG. 8 is an illustrative diagram representing synchronization of application and reservation signaling exchanges in accordance with the present invention.

FIG. 8 is an illustrative diagram 800 representing synchronization of application and reservation signaling exchanges in accordance with the present invention. Briefly, the top portion of the diagram illustrates a successful application session establishment. For example, the sender 110 and the application receiver 140 may wish to establish a request application, e.g., a VoIP call or VoD session. The sender 110 may then send a Path message 300 to the reservation receiver 130 with an illustrative request for fast path failure notification 360 ("with notify"). Notably, other triggers as described above (policy/configuration, etc.) may also be used in accordance with the present invention. The reservation receiver 130 returns a Resv message 400 to the sender 110 with a corresponding request for fast reservation failure notification 450 also to be sent to the sender as described herein. If no failures have occurred, the sender synchronizes the successful application with the reservation protocol, and the application session may be established between the sender 110 and application receiver 140.

The bottom portion of the diagram, however, illustrates an unsuccessful application session establishment. Here, for instance, an intermediate node 120 has detected a reservation failure (e.g., an admission control failure) upon receiving the Resv message 400. As a result of the included fast reservation failure notification request 450, the intermediate node generates and sends a fast reservation failure notification 600 to the sender, i.e., according to the address 455 contained within the request 450 in accordance with the present invention. As mentioned above, a ResvErr message 500 may also be returned from the intermediate node to the reservation receiver (not shown). The sender 110 may then synchronize the failed application session to the application receiver 140, and the application session is not established (i.e., is unsuccessful).

Figure 9:
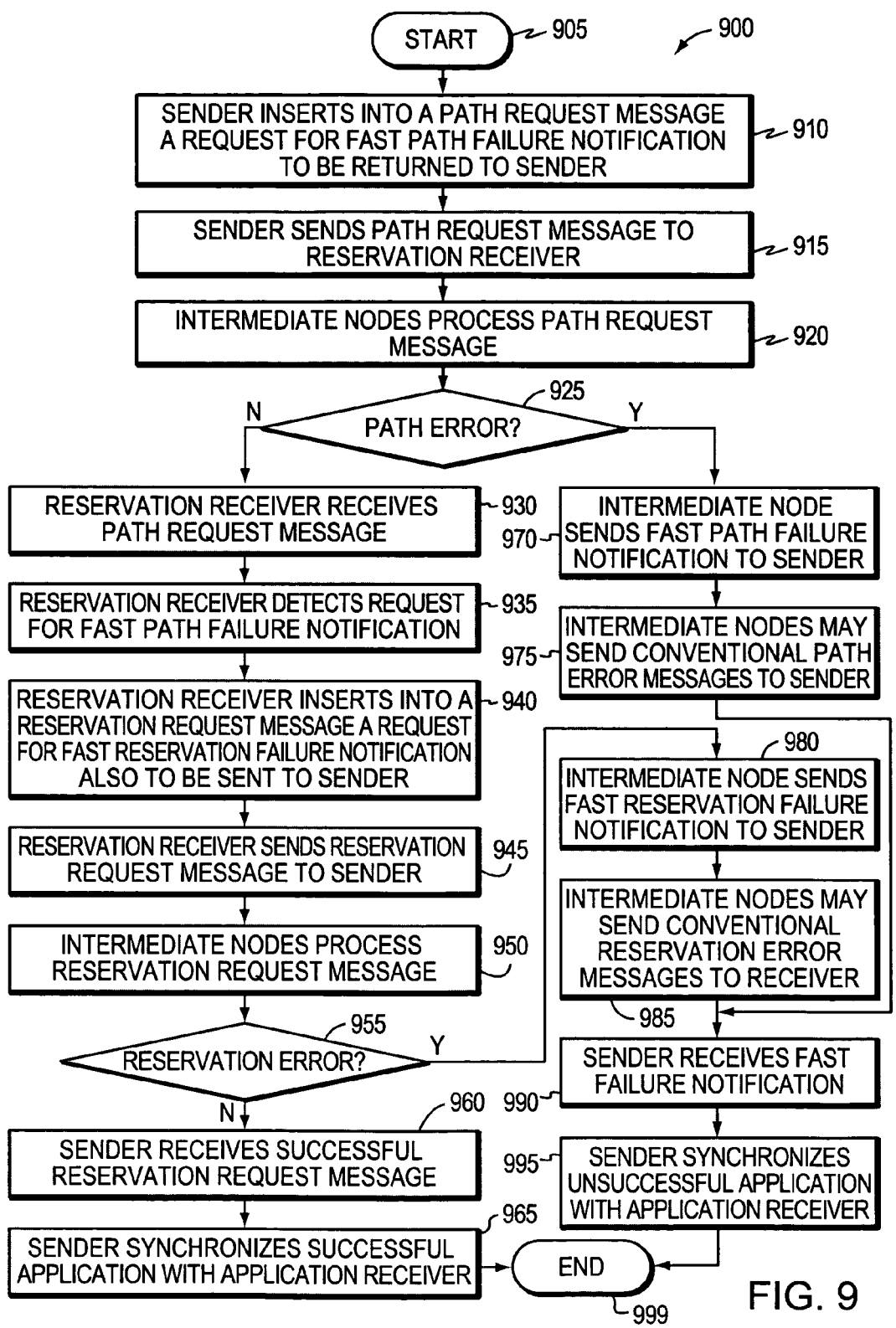
FIG. 9 is a flowchart illustrating a procedure for facilitating application synchronization with a reservation protocol at a sender in accordance with the present invention.

FIG. 9 is a flowchart illustrating a procedure for facilitating application synchronization with a reservation protocol at a sender in accordance with the present invention. The procedure 900 starts at step 905, and continues to step 910, where the sender (e.g., sender 110) may insert into a path request message (e.g., an RSVP Path message 300) a request for fast path failure notification 360 to be returned to the sender. At step 915, the sender sends the path request message to the reservation receiver (e.g., the Reservation Receiver Proxy 130). One or more intermediate nodes (e.g., nodes 120A-C) between the sender and the reservation receiver receive and process the path request message in step 920. So long as each of the intermediate nodes determine that a path error does not exist at step 925, the reservation receiver receives the path request message at step 930. The reservation receiver may then detect from within the path request that the sender has requested fast path failure notification in step 935. Notably, where the reservation receiver does not detect the requested fast failure notification or other trigger (step not shown), failure notification may be handled in a conventional manner, as will be understood by those skilled in the art.

In response to detecting the request for fast path failure notification in step 935, the reservation receiver inserts into a reservation request message (e.g., an RSVP Resv message 400) a request for fast reservation failure notification 450 also to be sent to the sender at step 940. As mentioned above, however, those skilled in the art will understand that the reservation receiver may alternatively be configured to insert a request for fast reservation failure notification 450 in response to other triggers (e.g., policy/configuration, etc.), as well. At step 945, the reservation receiver sends the reservation request message to the sender, which may be received and processed along the way by the intermediate nodes in step 950. If no reservation errors are detected at the intermediate nodes in step 955, then the sender eventually receives a successful reservation request message at step 960. In that case, the sender may synchronize a successful application with the application receiver (e.g., application receiver 140A) in step 965, and the procedure ends at step 999.

In the event that a path error or reservation error is detected by any one of the intermediate nodes in steps 925 or 955, respectively, corresponding fast failure notification is sent to the sender. For instance, if a path failure is detected, the intermediate node sends a fast path failure notification in step 970, while if a reservation failure is detected, a fast reservation failure notification is sent in step 980. Notably, as will be understood by those skilled in the art, the intermediate nodes may send conventional path error messages to the sender in step 975 and reservation error messages to the reservation receiver in step 985, as mentioned above. Once sent, the sender receives the fast failure notifications in step 990, and synchronizes an unsuccessful application with the application receiver in step 995 as described above. The procedure ends at step 999.

Advantageously, the novel technique facilitates application synchronization with a reservation protocol at a sender without application receiver participation in a computer network. By directing fast reservation failure notification to the sender instead of the reservation receiver, the novel technique allows the sender to synchronize the application with the reservation protocol by itself. In particular, application synchronization may be possible at the sender where the application receiver/end-point is different from the reservation receiver/end-point, e.g., such as where a reservation receiver proxy is used. Also, processing of the failure notifications by intermediate nodes may be reduced, e.g., due to the fewer number of nodes having to forward the failure notifications to reach the sender. Further, the dynamic nature of the novel technique alleviates the need for cumbersome manual configuration.

While there has been shown and described an illustrative embodiment that facilitates application synchronization with a reservation protocol at a sender without application receiver participation in a computer network, it is to be understood that various other adaptations and modifications may be made within the spirit and scope of the present invention. For example, the invention has been shown and described herein using RSVP as the reservation protocol signaling exchange. However, the invention in its broader sense is not so limited, and may, in fact, be used with other reservation signaling exchanges as will be understood by those skilled in the art. Moreover, while the above description describes performing the technique at a sender for both the application and reservation level, the invention may also be advantageously used with an application sender and a sender proxy, as will also be understood by those skilled in the art. For instance, the sender proxy may request that fast failure notifications (e.g., for path request failures or reservation failures) be sent to a single application/reservation receiver, which may then synchronize the application with the application sender. Alternatively, the application sender and sender proxy may be configured to exchange synchronization messages in response to the sender proxy's receipt of fast reservation failure notification as described above.

Notably, those skilled in the art will appreciate that it is hereby expressly contemplated that the reservation receiver 130 may alternatively be configured to send a fast failure notification as opposed to the "fake" PathErr message described as an inefficient solution above. For instance, once the reservation receiver receives a conventional fast reservation failure notification, instead of a fake PathErr message that must be processed hop-by-hop along the intermediate nodes, the reservation receiver may send a fast path or fast reservation failure notification message to the sender to avoid such associated delays. However, while providing fast failure notification to the sender, this solution still suffers from inefficiencies. Specifically, the fast failure notification must first travel to the reservation receiver, which must then process the notification, and then the fast failure notification must be sent to the sender. Those skilled in the art will thus understand that while this briefly proposed solution is feasible, it is not as efficient as the technique described herein for the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for facilitating application synchronization with a reservation protocol at a sender node without application receiver participation in a computer network, the method comprising:

sending a path request message from the sender node to a reservation receiver;

receiving the path request message at the reservation receiver;

in response, returning a reservation request message from the reservation receiver to the sender node, the reservation request message including a request for fast reservation failure notification to be sent to the sender node if an error occurs in response to the reservation request message, fast reservation failure notification being notification that bypasses per-hop processing at intervening nodes while in transit;

detecting an error in response to the reservation request message at an intermediate node between the sender node and reservation receiver;

in response, sending fast reservation failure notification from the intermediate node to the sender node; and synchronizing the application with the reservation protocol without application receiver participation based on receipt of either the fast failure notification or a successful reservation request message at the sender node.

2. The method as in claim 1, further comprising:

sending the path request message from the sender node to the reservation receiver, the path request message including a request for fast path failure notification to be returned to the sender node;

detecting the fast failure notification request within the path request message at the reservation receiver; and returning the reservation request message from the reservation receiver to the sender node including the request for fast reservation failure notification to be sent to the sender node in response to detecting the fast failure notification request within the path request message.

3. The method as in claim 2, wherein the path request message and reservation request message are embodied as Resource ReSerVation Protocol (RSVP) signaling messages.

4. The method as in claim 3, further comprising:

utilizing a Notify feature of RSVP signaling messages to request fast failure notification.

5. The method as in claim 2, further comprising:

inserting into the request for fast reservation failure notification of the path request message, by the sender node, an address of the sender node to request that the fast path failure notification be returned to the sender node.

6. The method as in claim 2, further comprising:

inserting into the request for fast reservation failure notification of the path request message, by the sender node, an address to request that the fast path failure notification be sent to that address; and inserting into the request for fast reservation failure notification of the reservation request, by the reservation receiver, the address of the request for fast reservation failure notification of the path request message to request that the fast reservation failure notification be sent to that address.

7. The method as in claim 1, further comprising:
inserting into the request for fast reservation failure notification of the reservation request, by the reservation receiver, an address of the sender node to request that the fast reservation failure notification be sent to the sender node.

8. The method as in claim 1, wherein the reservation receiver is a reservation receiver proxy upstream from the application receiver.

9. The method as in claim 1, further comprising:
sending fast reservation failure notification having reservation error codes from the intermediate node to the sender node; and
interpreting the reservation error codes at the sender node.

10. The method as in claim 1, further comprising:
sending conventional reservation failure notification from the intermediate node to the reservation receiver in response to detecting an error in response to the reservation request message.

11. The method as in claim 1, wherein the reservation receiver and the application receiver are a same receiver.

12. The method as in claim 1, wherein the sender node is a content server.

13. The method as in claim 12, wherein the content server is a Video on Demand (VoD) server.

14. The method as in claim 13, wherein the application receiver is a set-top-box.

15. The method as in claim 1, wherein the application is a Voice over Internet Protocol (VoIP) session.

16. The method as in claim 1, further comprising:
returning the reservation request message from the reservation receiver to the sender node including the request for fast reservation failure notification to be sent to the sender node in response to local policy of the reservation receiver.

17. An apparatus adapted to facilitate application synchronization with a reservation protocol at a sender node without application receiver participation in a computer network, the apparatus comprising:
means for sending a path request message from the sender node to a reservation receiver;
means for receiving the path request message at the reservation receiver;
means for returning a reservation request message from the reservation receiver to the sender node in response to receiving the path request message at the reservation receiver, the reservation request message including a request for fast reservation failure notification to be sent to the sender node if an error occurs in response to the reservation request message, fast reservation failure notification being notification that bypasses per-hop processing at intervening nodes while in transit;
means for detecting an error in response to the reservation request message at an intermediate node between the sender node and reservation receiver;
means for sending fast reservation failure notification from the intermediate node to the sender node in response to detecting an error in response to the reservation request; and
means for synchronizing the application with the reservation protocol without application receiver participation based on receipt of either the fast failure notification or a successful reservation request message at the sender node.

18. The apparatus as in claim 17, further comprising:
means for sending the path request message from the sender node to the reservation receiver, the path request message including a request for fast path failure notification to be returned to the sender node;
means for detecting the fast failure notification request within the path request message at the reservation receiver; and
means for returning the reservation request message from the reservation receiver to the sender node including the request for fast reservation failure notification to be sent to the sender node in response to detecting the fast failure notification request within the path request message.

19. A computer readable medium containing executable program instructions for facilitating application synchronization with a reservation protocol at a sender node without application receiver participation in a computer network, the executable program instructions comprising program instructions for:
sending a path request message from the sender node to a reservation receiver;
receiving the path request message at the reservation receiver;
in response, returning a reservation request message from the reservation receiver to the sender node, the reservation request message including a request for fast reservation failure notification to be sent to the sender node if an error occurs in response to the reservation request message, fast reservation failure notification being notification that bypasses per-hop processing at intervening nodes while in transit;
detecting an error in response to the reservation request message at an intermediate node between the sender node and reservation receiver;
in response, sending fast reservation failure notification from the intermediate node to the sender node; and
synchronizing the application with the reservation protocol without application receiver participation based on receipt of either the fast failure notification or a successful reservation request message at the sender node.

20. The computer readable medium as in claim 19, wherein the executable program instructions further comprise program instructions for:
sending the path request message from the sender node to the reservation receiver, the path request message including a request for fast path failure notification to be returned to the sender node;
detecting the fast failure notification request within the path request message at the reservation receiver; and
returning the reservation request message from the reservation receiver to the sender node including the request for fast reservation failure notification to be sent to the sender node in response to detecting the fast failure notification request within the path request message.

21. A system configured to facilitate application synchronization with a reservation protocol in a computer network, the system comprising:
a sender node configured to send a path request message;
a reservation receiver configured to receive the path request message, and in response, return a reservation request message to the sender node, the reservation request message including a request for fast reservation failure notification to be sent to the sender node if an error occurs in response to the reservation request message, fast reservation failure notification being notification that bypasses per-hop processing at intervening nodes while in transit; and an intermediate node between the sender node and the reservation receiver, the intermediate node configured to detect an error in response to the reservation request message, and in response, send fast reservation failure notification from the intermediate node to the sender node, wherein the sender node is further configured to synchronize the application with the reservation protocol without reservation receiver participation based on receipt of either the fast failure notification or a successful reservation request message.

22. The system as in claim 21, wherein the sender node is further configured to send the path request message to the reservation receiver, the path request message including a request for fast path failure notification to be returned to the sender node; and the reservation receiver is further configured to detect the fast failure notification request within the path request message, and return the reservation request message to the sender node including the request for fast reservation failure notification to be sent to the sender node in response to detecting the fast failure notification request within the path request message.

23. A reservation receiver node for facilitating application synchronization with a reservation protocol in a computer network, the reservation receiver node comprising:
    one or more network interfaces;
    a processor coupled to the one or more network interfaces and configured to execute software processes; and
    a memory configured to store a reservation process executable by the processor, the reservation process when executed operable to: i) receive a path request message from a sender node, and ii) in response, return a reservation request message to the sender node, the reservation request message including a request for fast reservation failure notification to be sent to the sender node if an error is detected in response to the reservation request message at an intermediate node between the sender node and the reservation receiver, fast reservation failure notification being notification that bypasses per-hop processing at intervening nodes while in transit, the reservation failure notification to permit the sender node to synchronize the application with the reservation protocol without reservation receiver participation based on receipt of either the fast failure notification or a successful reservation request message.

24. The reservation receiver node as in claim 23, wherein the reservation process is further configured to iii) receive the path request message from a sender node, the path request message including a request for fast path failure notification to be returned to the sender node, iv) detect the fast failure notification request within the path request message, and v) return the reservation request message to the sender node including the request for fast reservation failure notification to be sent to the sender node in response to detecting the fast failure notification request within the path request message.

25. An intermediate node for facilitating application synchronization with a reservation protocol in a computer network, the intermediate node comprising:
    one or more network interfaces;
    a processor coupled to the one or more network interfaces and configured to execute software processes; and
    a memory configured to store a reservation process executable by the processor, the reservation process when executed operable to: i) detect an error in response to a reservation request message sent from a reservation receiver node to a sender node, the reservation request message including a request for fast reservation failure notification to be sent to the sender node if an error occurs in response to the reservation request message, and ii) in response, send fast reservation failure notification to the sender node, fast reservation failure notification being notification that bypasses per-hop processing at intervening nodes while in transit, the reservation failure notification to permit the sender node to synchronize the application with the reservation protocol without reservation receiver participation based on receipt of either the fast failure notification or a successful reservation request message.

* * * * *

UNITED STATES PATENT AND TRADEMARK OFFICE
CERTIFICATE OF CORRECTION

PATENT NO.        : 7,702,816 B2                                          Page 1 of 1
APPLICATION NO.   : 11/395592
DATED             : April 20, 2010
INVENTOR(S)       : Ashok Narayanan It is certified that error appears in the above-identified patent and that said Letters Patent is hereby corrected as shown below:

Col. 3, Line 50, please amend as shown:

requests the session [[is]] by sending an "offer" to the receiver,

Col. 7, Line 35, please amend as shown:

244, [[is]] traffic control services 246, routing services 247, and

Signed and Sealed this

Fifteenth Day of June, 2010

David J. Kappos
*Director of the United States Patent and Trademark Office*